United States Patent
Fang et al.

(10) Patent No.: US 10,254,892 B2
(45) Date of Patent: Apr. 9, 2019

(54) HOTKNOT BASED PROXIMITY DETECTION METHOD, APPARATUS AND TOUCH SCREEN TERMINAL

(71) Applicant: Shenzhen Goodix Technology Co., Ltd., Shenzhen (CN)

(72) Inventors: Jun Fang, Shenzhen (CN); Yuepeng Wan, Shenzhen (CN)

(73) Assignee: Shenzhen Goodix Technology Co., Ltd., Shenzhen (CN)

(*) Notice: Subject to any disclaimer, the term of this patent is extended or adjusted under 35 U.S.C. 154(b) by 125 days.

(21) Appl. No.: 15/289,203

(22) Filed: Oct. 9, 2016

(65) Prior Publication Data
US 2017/0024081 A1 Jan. 26, 2017

Related U.S. Application Data

(63) Continuation of application No. PCT/CN2015/077048, filed on Apr. 21, 2015.

(30) Foreign Application Priority Data

Apr. 1, 2015 (CN) .......................... 2015 1 0153132

(51) Int. Cl.
*G06F 3/041* (2006.01)
*G06F 3/044* (2006.01)
(Continued)

(52) U.S. Cl.
CPC ............ *G06F 3/0418* (2013.01); *G06F 3/044* (2013.01); *H04B 17/27* (2015.01);
(Continued)

(58) Field of Classification Search
CPC .................. G06F 3/0418; G06F 3/044; G06F 2203/04107; G06F 2203/04108; H04B 17/27; H04B 17/318; H04B 5/0012
See application file for complete search history.

(56) References Cited

U.S. PATENT DOCUMENTS 8,923,208 B2 * 12/2014 Dayal ............... H04W 72/1215
370/328
9,860,930 B2 * 1/2018 Chiang ................. H04W 76/14
(Continued)

FOREIGN PATENT DOCUMENTS

CN 103701508 A 4/2014
CN 103701545 A 4/2014

OTHER PUBLICATIONS

Office Action for corresponding Chinese Application No. 201510153132.2, Applicant: Shenzhen Huiding Technology Co., Ltd., May 22, 2017, 6 pages.
(Continued)

*Primary Examiner* — Christopher E Leiby

(57) ABSTRACT

A proximity detection method and apparatus, and a touch screen terminal are provided. The method includes: sending a proximity detection sequence to a touch screen terminal; after the touch screen terminal determines that the proximity detection sequence is valid, receiving a proximity response sequence fed back by the touch screen terminal; and determining whether the proximity response sequence is valid according to signal strength of frequencies in the proximity response sequence and at least two preset signal strength thresholds, to determine whether the touch screen terminal approaches.

12 Claims, 3 Drawing Sheets

(51) Int. Cl.
*H04B 17/27* (2015.01)
*H04B 5/00* (2006.01)
*H04B 17/318* (2015.01)

(52) U.S. Cl.
CPC .............. *G06F 2203/04107* (2013.01); *G06F 2203/04108* (2013.01); *H04B 5/0012* (2013.01); *H04B 17/318* (2015.01)

(56) References Cited

U.S. PATENT DOCUMENTS

| | | | | |
|---|---|---|---|---|
| 2011/0304583 | A1* | 12/2011 | Kruglick | G06F 3/044 345/174 |
| 2014/0354590 | A1* | 12/2014 | Wang | G06F 3/044 345/174 |
| 2015/0004912 | A1 | 1/2015 | Diamond et al. | |
| 2015/0173116 | A1* | 6/2015 | Chiang | G06F 3/0488 455/41.1 |
| 2015/0261280 | A1* | 9/2015 | Hsiao | G06F 3/0416 345/173 |
| 2015/0261356 | A1* | 9/2015 | Shepelev | G06F 3/044 345/174 |
| 2016/0345372 | A1* | 11/2016 | Chiang | H04W 76/14 |

OTHER PUBLICATIONS

Steven A. Tretter et al, "Continuous-Phase Frequency Shift Keying (FSK)", Additional Experiments for Communication System Design Using DSP Algorithms: With Laboratory Experiments for the TMS320C6713 DSK, Apr. 15, 2014, XP055516689, Boston, 32 pages total, Retrieved from internet URL: https://ece.umd.edu/~tretter/commlab/c6713slides/fskChapter.pdf.

* cited by examiner

HOTKNOT BASED PROXIMITY DETECTION METHOD, APPARATUS AND TOUCH SCREEN TERMINAL

CROSS-REFERENCE TO RELATED APPLICATIONS

The present application is a continuation of international application No. PCT/CN2015/077048, filed on Apr. 21, 2015, which claims priority to Chinese Patent Application No. 201510153132.2, filed on Apr. 1, 2015, both of which are hereby incorporated by reference in their entireties.

TECHNICAL FIELD

The present application relates to the field of data communication technologies, and in particular to a touch screen terminal and a HotKnot based proximity detection method and apparatus for the touch screen terminal.

BACKGROUND

HotKnot is a near-field communication technology (which is mainly used in a capacitive touch screen) used in some smart terminal devices. This near-field communication includes two processes: proximity detection process and data transmission process. The proximity detection process of the near-field communication is: a touch screen terminal of one party sends a proximity detection sequence (for example, the proximity detection sequence includes six frequencies), and after receiving the proximity detection sequence, a touch screen terminal of the other party successively scans the multiple frequencies included in the proximity detection sequence. If signal strength at each frequency is greater than a preset signal strength threshold, it is considered that a signal source exists at the frequency. After the scan is completed, if signal sources exist at all frequencies, it is determined that the sequence is valid; otherwise, it is determined that the sequence is invalid. After it is determined that the sequence is valid, the receiving party feeds back a proximity response sequence to the sending party. After receiving the proximity response sequence, the sending party successively performs scan similarly, and determines whether the response sequence is valid. The determining manner is described above. When the two parties both consider that the sequence is valid, it is considered that sequence identification succeeds once. After the sequence identification succeeds for multiple times according to an interaction rule, it is determined that a touch screen terminal approaches. After the proximity detection succeeds, an interference source is turned off, and the data transmission process is started to send or receive data. During the proximity detection, the interference source such as an LCD is not turned off, there is a relatively big difficulty to correctly determine a frequency of the sequence, and setting of a signal strength threshold plays a particularly important role in determining of a signal. Therefore, it appears to be particularly important to be capable of setting a proper signal strength threshold according to a noise situation.

During proximity detection of two HotKnot (which is a type of near-field communication and is mainly used in the capacitive touch screen) devices, a drive signal of LCD scan, or common-mode interference when a charger is connected interferes with signal detection of the capacitive touch screen, which may cause an error when the proximity detection is performed by using the touch screen, and a case in which the two parties cannot enter or one party enters by a mistake. Currently, to enable the capacitive touch screen to adapt to different LCD interference intensities, noise reduction processing is usually performed on detected data. After the noise reduction processing, a signal strength threshold determining policy is used. If signal strength is greater than the threshold, it is considered that a signal is valid; otherwise, it is considered that the signal is an invalid signal. In addition, for the foregoing interference cases, an interference frequency is detected by using an instrument, and then the interference frequency is not used as a determining basis, thereby avoiding an interference sources.

However, in a current processing manner, there are at least two problems: 1) Although some problems can be solved by using a proper signal strength threshold, when interference occurs at some frequencies, signal strength of noise is sometimes greater than strength of a signal, and the frequencies are very difficult to be identified, which finally results in failure of entire sequence identification; and in addition, interference intensity often changes, detection reliability and sensitivity are difficult to be ensured if only one fixed signal strength threshold is used. 2) Interference in an actual environment often changes; if some fixed frequencies are not identified, although a situation of interference at the fixed frequencies can be improved, when the interference at the frequencies changes, the changed interference frequencies cannot be shielded, that is, a compatibility problem exists. Therefore, in the case of weak signal or strong interference, reliability and sensitivity of proximity detection are not high.

SUMMARY

Accordingly, the technical problem of certain embodiments of the present invention is to provide a touch screen terminal and a proximity detection method and apparatus that are based on HotKnot, so as to solve a compatibility problem in the proximity detection method with fixed single signal strength threshold for shielding a fixed interference frequency, and to solve the technical problem that the reliability and sensitivity of the proximity detection are not high enough.

Certain embodiments of the present application overcome the foregoing technical problem with a technical solution defined as follows:

According to an aspect, a proximity detection method that is based on HotKnot, including:

sending a proximity detection sequence to a second touch screen terminal, wherein the proximity detection sequence includes at least two symbols modulated by using different frequencies;

after the second touch screen terminal determines that the proximity detection sequence is valid, receiving a proximity response sequence fed back by the second touch screen terminal, where symbols included in the proximity response sequence are the same as those included in the proximity detection sequence; and determining whether the proximity response sequence is valid according to signal strength of frequencies in the proximity response sequence and at least two preset signal strength thresholds, to determine whether the second touch screen terminal approaches.

Preferably, the proximity detection sequence includes [F1, F2, F3, F4, F5, F6], where the F1, F2, F3, F4, F5, and F6 are respectively symbols modulated by using different frequencies, respectively indicate symbols modulated by using 450 KHz, 400 KHz, 350 KHz, 300 KHz, 250 KHz, and 200 KHz, or respectively indicate any six successive frequencies of {525 KHz, 487.5 KHz, 412.5 KHz, 375 KHz, 337.5 KHz, 262.5 KHz, 225 KHz, 187.5 KHz} in a frequency set.

Preferably, the determining whether the proximity response sequence is valid according to signal strength of frequencies in the proximity response sequence and at least two preset signal strength thresholds, to determine whether the second touch screen terminal approaches further includes:

recording a signal strength threshold range within which signal strength of each frequency in the proximity response sequence falls respectively, where the signal strength threshold range is defined by at least two signal strength thresholds; and when the signal strength threshold range meets a preset condition, determining that the proximity response sequence is valid, and then determining that the second touch screen terminal approaches.

Preferably, the when the signal strength threshold range meets a preset condition, determining that the proximity response sequence is valid, and then determining that the second touch screen terminal approaches further includes:

when there are two preset signal strength thresholds and the proximity response sequence includes six symbols modulated by using different frequencies, in the following case, determining that the second touch screen terminal approaches: signal strength at all frequencies is greater than a first signal strength threshold; or signal strength at five frequencies is greater than a first signal strength threshold, and signal strength at four frequencies thereof exceeds a second signal strength threshold; or signal strength at four frequencies is greater than a first signal strength threshold, and signal strength at four frequencies thereof exceeds a second signal strength threshold; or when there are three preset signal strength thresholds and the proximity response sequence includes six symbols modulated by using different frequencies, in the following case, determining that the second touch screen terminal approaches: signal strength at all frequencies is greater than a first signal strength threshold; or signal strength at five frequencies is greater than a first signal strength threshold, and signal strength at three frequencies thereof exceeds a second signal strength threshold, and signal strength at one frequency thereof exceeds a third signal strength threshold; or signal strength at four frequencies is greater than a first signal strength threshold, and signal strength at three frequencies thereof exceeds a third signal strength threshold, where the second signal strength threshold is greater than the first signal strength threshold, and the third signal strength threshold is greater than the second signal strength threshold.

Preferably, the method further includes:
sending a proximity detection sequence to the second touch screen terminal repeatedly for multiple times, and receiving a corresponding approach response sequence fed back by the second touch screen terminal; and within a preset time period, if a quantity of times for determining that the proximity response sequence is valid is greater than a preset quantity of times, finally determining that the second touch screen terminal approaches.

Preferably, the method further includes:
within the preset time period, counting a proportion by which signal strength at each frequency in all approach response sequences is less than a minimum signal strength threshold; and when the proportion for a frequency exceeds a preset proportion threshold, shielding the frequency.

According to another aspect of the present invention, a proximity detection apparatus that is based on HotKnot is provided, including the following modules:

a transmission module, configured to send a proximity detection sequence to a second touch screen terminal, where the proximity detection sequence includes at least two symbols modulated by using different frequencies;

a receiving module, configured to: after the second touch screen terminal determines that the proximity detection sequence is valid, receive a proximity response sequence fed back by the second touch screen terminal, where symbols included in the proximity response sequence are the same as those included in the proximity detection sequence; and a frequency scan module, configured to determine whether the proximity response sequence is valid according to signal strength of frequencies in the proximity response sequence and at least two preset signal strength thresholds, to determine whether the second touch screen terminal approaches.

Preferably, the frequency scan module further includes:
an acquiring unit, configured to record a signal strength threshold range within which signal strength of each frequency in the proximity response sequence falls respectively, where the signal strength threshold range is defined by at least two signal strength thresholds; and a determining unit, configured to: when the signal strength threshold range meets a preset condition, determine that the proximity response sequence is valid, and then determine that the second touch screen terminal approaches.

Preferably, the determining unit is specifically configured to:

when there are two preset signal strength thresholds and the proximity response sequence includes six symbols modulated by using different frequencies, in the following case, determine that the second touch screen terminal approaches: signal strength at all frequencies is greater than a first signal strength threshold; or signal strength at five frequencies is greater than a first signal strength threshold, and signal strength at four frequencies thereof exceeds a second signal strength threshold; or signal strength at four frequencies is greater than a first signal strength threshold, and signal strength at four frequencies thereof exceeds a second signal strength threshold; or when there are three preset signal strength thresholds and the proximity response sequence includes six symbols modulated by using different frequencies, in the following case, determine that the second touch screen terminal approaches: signal strength at all frequencies is greater than a first signal strength threshold; or signal strength at five frequencies is greater than a first signal strength threshold, and signal strength at three frequencies thereof exceeds a second signal strength threshold, and signal strength at one frequency thereof exceeds a third signal strength threshold; or signal strength at four frequencies is greater than a first signal strength threshold, and signal strength at three frequencies thereof exceeds a third signal strength threshold, where the second signal strength threshold is greater than the first signal strength threshold, and the third signal strength threshold is greater than the second signal strength threshold.

Preferably, the transmission module is further configured to send a proximity detection sequence to the second touch screen terminal repeatedly for multiple times; the receiving module is further configured to receive a corresponding approach response sequence fed back by the second touch screen terminal; and the frequency scan module is further configured to: within a preset time period, if a quantity of times for determining that the proximity response sequence is valid is greater than a preset quantity of times, finally determine that the second touch screen terminal approaches.

Preferably, the foregoing apparatus further includes an interference shielding module, specifically configured to: within the preset time period, count a proportion by which signal strength at each frequency in all approach response sequences is less than a minimum signal strength threshold; and when the proportion for a frequency exceeds a preset proportion threshold, shield the frequency.

According to still another aspect of the present invention, a provided touch screen terminal includes the proximity detection apparatus that is based on HotKnot in the foregoing technical solution.

By means of a proximity detection method and apparatus that are based on HotKnot, and a touch screen terminal that are provided in the present invention, on the basis of a basic threshold, multiple levels of signal strength thresholds are used, and a quantity of sequence frequencies that require to be identified is dynamically adjusted by using the multiple threshold levels according to HotKnot signal strength, thereby improving performance of approach detection in a case in which interference occurs at some frequencies, and increasing reliability and sensitivity of the proximity detection.

In addition, in the present invention, statistics on a history identification situation are further collected, to find some frequencies that often cannot be identified, and shield these frequencies as frequencies at which interference occurs, so that the frequencies at which interference occurs are dynamically shielded according to a detection result, to reduce the interference to the minimum, which can further increase approach detection reliability and communication quality in a case in which a signal is relatively weak.

DETAILED DESCRIPTION

To make technical problem(s), technical solution(s), and effect(s) of the present invention clearer, the following further describes certain examples of the present invention in detail with reference to accompanying drawings and embodiments. It should be understood that, the specific embodiments described herein are only used to understand the present invention, but are not used to limit the scope of the present invention.

Embodiment 1

Figure 1:
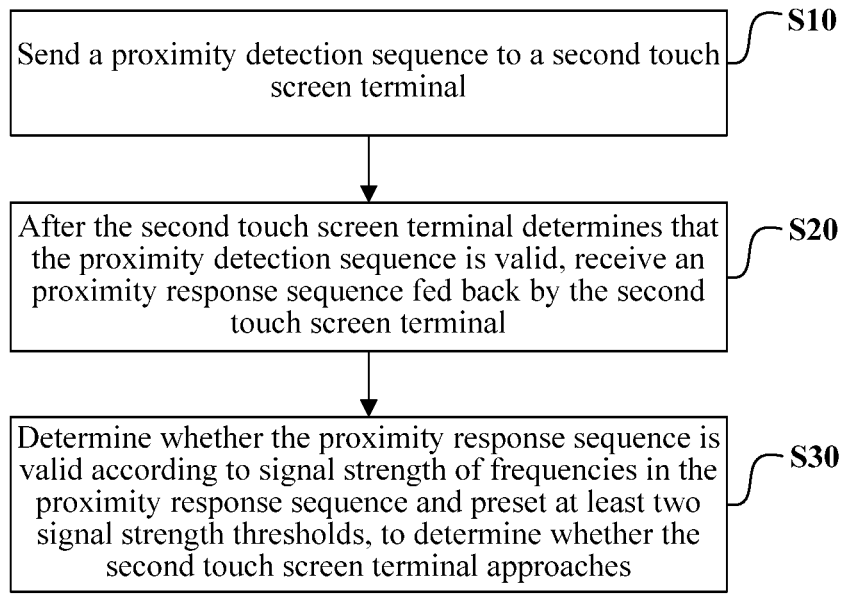
FIG. 1 is a flowchart of a proximity detection method that is based on HotKnot according to an embodiment of the present invention.

FIG. 1 is a flowchart of a proximity detection method that is based on HotKnot according to an embodiment of the present invention. The method can be applied to a first touch screen terminal, and includes the following steps:

S10: A first touch screen terminal sends a proximity detection sequence to a second touch screen terminal, and the proximity detection sequence includes at least two symbols modulated by using different frequencies.

Specifically, the modulation frequencies used in the proximity detection sequence are communication frequencies supported by the first touch screen terminal. For example, a touch screen device supports communication at six frequencies, and then a proximity detection sequence of the touch screen device includes [F1, F2, F3, F4, F5, F6], where the F1, F2, F3, F4, F5, and F6 are respectively symbols modulated by using different frequencies. More specifically, for example, they respectively indicate symbols modulated by using 450 KHz, 400 KHz, 350 KHz, 300 KHz, 250 KHz, and 200 KHz, or respectively indicate any six frequencies of {525 KHz, 487.5 KHz, 412.5 KHz, 375 KHz, 337.5 KHz, 262.5 KHz, 225 KHz, 187.5 KHz} in a frequency set. Certainly, another detection sequence may also be used according to a protocol.

S20: After the second touch screen terminal determines that the proximity detection sequence is valid, receive a proximity response sequence fed back by the second touch screen terminal, where symbols included in the proximity response sequence are the same as those included in the proximity detection sequence.

Specifically, after receiving a proximity detection sequence, the second touch screen terminal successively scans signal strength of frequencies that are included in the proximity detection sequence, to determine whether the proximity detection sequence is valid. A determining manner is described in detail below. If it is determined that the proximity detection sequence is valid, a proximity response sequence is fed back, and the first touch screen terminal receives the proximity response sequence, and performs step S30; or if it is determined that the proximity detection sequence is invalid, a proximity response sequence is not fed back. Similar to the proximity detection sequence, the proximity response sequence also includes symbols modulated by using different frequencies.

S30: Determine whether the proximity response sequence is valid according to signal strength of frequencies in the proximity response sequence and at least two preset signal strength thresholds, to determine whether the second touch screen terminal approaches.

Figure 2:
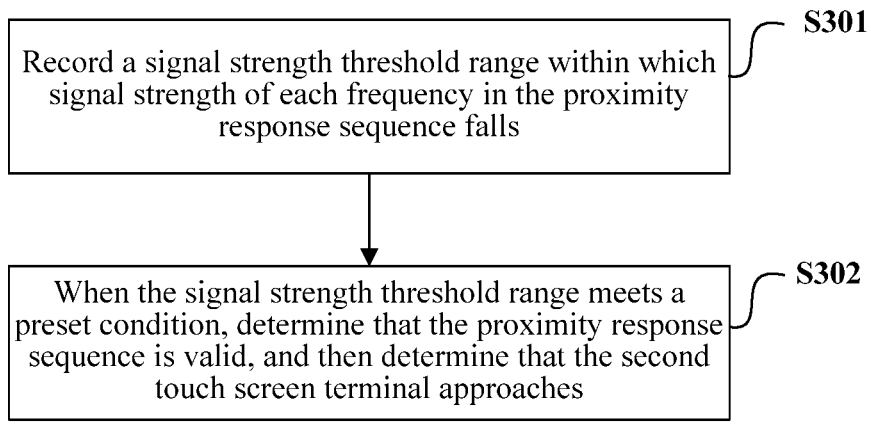
FIG. 2 is a flowchart of a response sequence processing method according to a preferable embodiment of the present invention.

Preferably, referring to FIG. 2, step S30 further includes:

S301: Record a signal strength threshold range within which signal strength of each frequency in the proximity response sequence falls respectively, where the signal strength threshold range is defined by at least two signal strength thresholds.

S302: When the signal strength threshold range meets a preset condition, determine that the proximity response sequence is valid, and then determine that the second touch screen terminal approaches.

For example, the touch screen device supports communication at six frequencies, and multiple levels of thresholds can beset, such as two to four levels. For example, three levels of thresholds are X1, X2, and X3, and X1<X2<X3 (a multiple relationship is preferred between the thresholds, for example, X2=2X1, and X3=3X1). When proximity detection is started, six frequencies are successively scanned, and a threshold range within which signal strength at each frequency falls respectively is recorded. Three levels of thresholds can form four threshold ranges: less than X1 (indicating that no frequency can be identified), between X1 and X2, between X2 and X3, and greater than X3. When most or all signal strength at the six frequencies fall within a relatively high threshold range, it is determined that a sequence is valid, and a touch screen approaches. Preferably:

Case 1: If six frequencies are all identified, that is, the six frequencies are all greater than X1, it is determined that the sequence is a valid sequence;

Case 2: If only five frequencies are identified, at least three frequencies thereof exceed X2, and at least one exceeds X3, it is determined that the sequence is valid;

Case 3: If only four frequencies are identified, and at least three frequencies thereof exceed X3, it is determined that the sequence is valid; and Other cases: It is determined that the sequence is invalid.

For another example, two levels of thresholds X1 and X2 are set, and X1<X2. The two levels of thresholds can form three threshold ranges: less than X1 (indicating that no frequency can be identified), between X1 and X2, and greater than X2. When most or all signal strength at the six frequencies fall within a relatively high threshold range, it is determined that the sequence is valid, and a touch screen approaches. Preferably:

Case 1: If six frequencies are all identified, that is, the six frequencies are all greater than X1, it is determined that the sequence is a valid sequence;

Case 2: If only five frequencies are identified, and at least four frequencies thereof exceed X2, it is determined that the sequence is valid;

Case 3: If only four frequencies are identified, and at least four frequencies thereof exceed X2, it is determined that the sequence is valid; and Other cases: It is determined that the sequence is invalid.

A manner for determining a proximity detection sequence is the same as a manner for determining a proximity response sequence. If both the first touch screen terminal and the second touch screen terminal determine that a sequence is valid, it is considered that sequence identification succeeds once.

To increase accuracy of frequency scan, six frequencies are scanned for multiple times, a given quantity of detections are performed, a sequence identification result of each time is synthesized, and then it is determined that a touch screen approaches. After step S30, the method further includes:

S40: Send a proximity detection sequence to the second touch screen terminal repeatedly for multiple times, and receive a proximity response sequence fed back by the second touch screen terminal.

No matter whether or not the second touch screen terminal feeds back the proximity response sequence, the first touch screen terminal sends a proximity detection sequence repeatedly for multiple times, and receives a corresponding proximity response sequence.

S50: Within a preset time period, if a quantity of times for determining that the proximity response sequence is valid is greater than a preset quantity of times, determine that the second touch screen terminal approaches.

Preferably, it is considered that the proximity detection succeeds only after the sequence identification succeeds for 12 times (that is, the first touch screen terminal performs scan for 12 times). The 12 times of sequence identification successes may be successive, or may be not successive.

In addition, corresponding to the proximity detection method applied to the first touch screen terminal, an embodiment of the present invention further provides a proximity detection method applied to the second touch screen terminal. The method includes: after receiving a proximity detection sequence, feeding back, by the second touch screen terminal, a proximity response sequence to the first touch screen terminal. Certainly, roles of the first touch screen terminal and the second touch screen terminal may be interchanged. When a touch screen terminal is used as an end for initiating communication, a role of the touch screen terminal is the first touch screen terminal. When a touch screen terminal is used as a passive end of communication, a role of the touch screen terminal is the second touch screen terminal.

By means of the proximity detection method that is based on HotKnot and that is provided in this embodiment of the present invention, on the basis of basic signal strength, multiple levels of signal strength thresholds are set, and a quantity of sequence frequencies that require to be identified is dynamically adjusted according to HotKnot signal strength by using the multiple threshold levels: In a high threshold mode, a quantity of sequence frequencies that require to be identified may decrease in successful identification of a sequence; or when signal strength is greater than a basic threshold and does not exceed a high threshold, a quantity of sequence frequencies that require to be identified increases. That is, when a signal is relatively strong, a quantity of frequencies that require to be correctly identified may decrease; or when a signal is relatively weak, a quantity of frequencies that require to be correctly identified increases, thereby improving performance of approach detection in a case in which interference occurs at some frequencies, and increasing reliability of the proximity detection.

Embodiment 2

Figure 3:
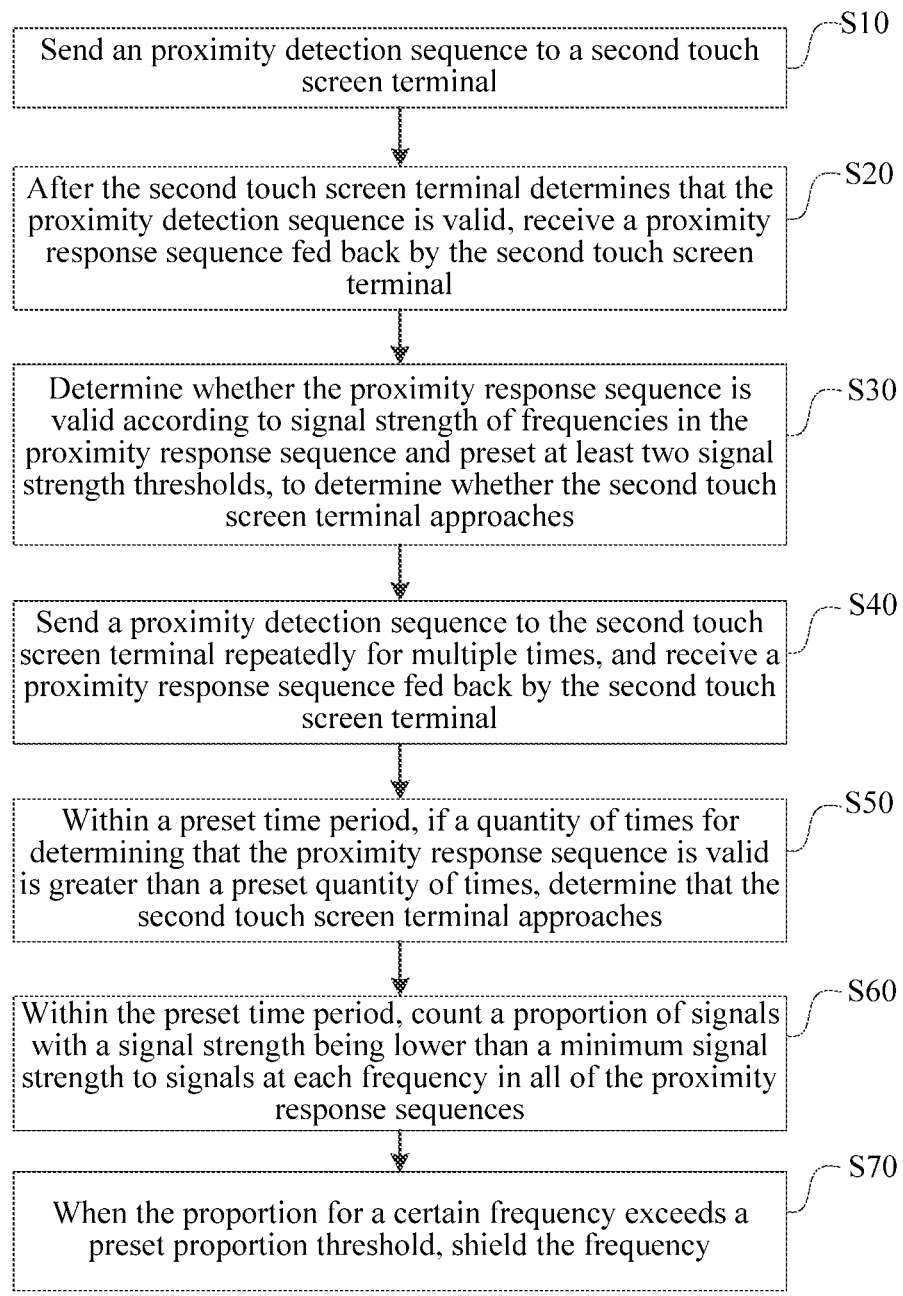
FIG. 3 is a flowchart of a proximity detection method that is based on HotKnot according to a preferable embodiment of the present invention.

FIG. 3 is a flowchart of a proximity detection method that is based on HotKnot according to a preferable embodiment of the present invention. The method may be applied to a first touch screen terminal, and specifically includes the following steps:

Steps S10, S20, S30, S40, and S50 are the same as those in Embodiment 1. Details are not described herein again. The method further includes:

S60: Within the preset time period, counting a proportion of signals with a signal strength being lower than a minimum signal strength to signals at each frequency in all of the proximity response sequences.

S70: When the proportion for a certain frequency exceeds a preset proportion threshold, shielding the frequency.

Specifically, conditions of medium and high thresholds among multiple levels of thresholds are relatively strict; therefore, when a signal is relatively strong, it can be processed via automatic thresholds, and signal identification is reliable. However, when a signal is relatively weak, reliability of signal identification decreases greatly. Using three levels of thresholds X1, X2, and X3 as an example, when the signal is relatively weak, a frequency at which interference occurs cannot be identified frequently, and strength of signals at other frequencies often cannot reach X2 and X3. In this case, when determining a sequence, missing frequencies must be counted frequencies which cannot be identified, and all other frequencies must be correctly identified. A frequency that cannot be detected (that is, signal strength is less than X1) for a plurality of times is automatically shielded according to a statistics result after multiple times of scans. All frequencies that are not shielded need to be correctly identified, that is, signal strength thereof must be greater than X1, and then it is considered that the frequency sequence is valid, and it is determined that the proximity detection succeeds.

Preferably, within the preset time period, the proportion of each frequency is counted; and when the proportion for a frequency exceeds the preset proportion threshold, the frequency is shielded. The threshold X1 which can be regarded as a first signal strength threshold X1 described herein refers to a basic threshold.

In this embodiment of the present invention, in addition to that a quantity of sequence frequencies that require to be identified is dynamically adjusted by using proper multiple levels of thresholds, statistics on a history identification situation may be further collected, to find some frequencies that often cannot be identified, and shield these frequencies as frequencies at which interference occurs, so that the frequencies at which interference occurs are dynamically shielded according to a detection result to reduce the interference to the minimum, which can not only increase proximity detection reliability and communication quality when interference is relatively strong, but also increase proximity detection reliability and communication quality when a signal is relatively weak.

Embodiment 3

Figure 4:
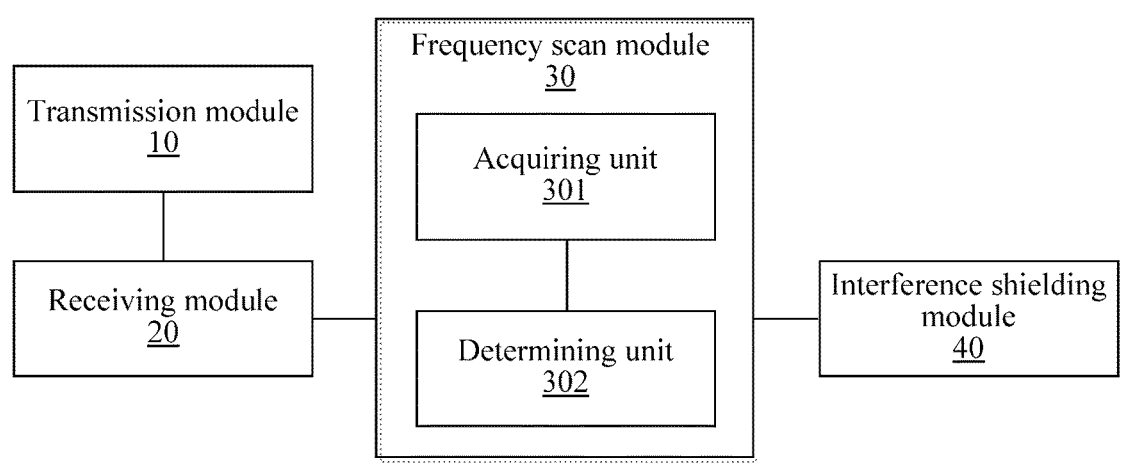
FIG. 4 is a structural diagram of modules of a proximity detection apparatus that is based on HotKnot according to a preferable embodiment of the present invention.

FIG. 4 shows a diagram of modules of a proximity detection apparatus that is based on HotKnot according to an embodiment of the present invention. The apparatus includes a transmission module 10, a receiving module 20, a frequency scan module 30, and an interference shielding module 40.

The transmission module 10 is configured to send a proximity detection sequence to a second touch screen terminal, where the proximity detection sequence includes at least two symbols modulated by using different frequencies.

The receiving module 20 is configured to receive a proximity response sequence fed back by the second touch screen terminal after the second touch screen terminal determines that the proximity detection sequence is valid, where symbols included in the proximity response sequence are the same as those included in the proximity detection sequence.

The frequency scan module 30 is configured to determine whether the proximity response sequence is valid according to signal strength of frequencies in the proximity response sequence and at least two preset signal strength thresholds, thus to determine whether the second touch screen terminal approaches.

According to another embodiment, the frequency scan module 30 further includes an acquiring unit 301 and a determining unit 302.

The acquiring unit 301 is configured to record a signal strength threshold range within which signal strength of each frequency in the proximity response sequence falls respectively, where the signal strength threshold range is defined by at least two signal strength thresholds.

The determining unit 302 is configured to determine that the proximity response sequence is valid when the signal strength threshold range meets a preset condition, and then determine that the second touch screen terminal approaches.

The determining unit 302 may be specifically configured to: when there are two preset signal strength thresholds and the proximity response sequence includes six symbols modulated by using different frequencies, determine that the second touch screen terminal approaches when: signal strength at all frequencies is greater than a first signal strength threshold; or signal strength at five frequencies is greater than the first signal strength threshold and signal strength at four frequencies thereof exceeds a second signal strength threshold; or signal strength at four frequencies is greater than a first signal strength threshold and signal strength at four frequencies thereof exceeds a second signal strength threshold.

The determining unit 302 also can be specifically configured to: when there are three preset signal strength thresholds and the proximity response sequence includes six symbols modulated by using different frequencies, determine that the second touch screen terminal approaches when: signal strength at all frequencies is greater than a first signal strength threshold; or signal strength at five frequencies is greater than the first signal strength threshold, signal strength at three frequencies thereof exceeds a second signal strength threshold, and signal strength at one frequency thereof exceeds a third signal strength threshold; or signal strength at four frequencies is greater than the first signal strength threshold, signal strength at three frequencies thereof exceeds a third signal strength threshold. The second signal strength threshold and the third signal strength threshold are an integer multiple of the first signal strength threshold.

To increase accuracy of frequency scan, the frequency scan may be performed for multiple times, a given quantity of detections can be performed, a sequence identification result of each time is synthesized, and then it is determined that a touch screen approaches. The transmission module 10 is further configured to send a proximity detection sequence to the second touch screen terminal repeatedly for multiple times; the receiving module 20 is further configured to receive a corresponding proximity response sequence fed back by the second touch screen terminal; and the frequency scan module 30 is further configured to finally determine that the second touch screen terminal approaches if a quantity of times for determining that the proximity response sequence is valid is greater than a preset quantity of times within the preset time period.

The interference shielding module 40 automatically shields, according to the signal strength of frequencies in the proximity response sequence and the signal strength thresholds, a frequency at which interference occurs.

Specifically, the interference shielding module 40 may be specifically configured to: within the preset time period, count a proportion of signals with signal strength lower than a minimum signal strength to signals at a frequency in all of the proximity response sequences; and when the proportion for a frequency exceeds a preset proportion threshold, shield the frequency.

All technical characteristics in the foregoing method according to Embodiment 1 and/or Embodiment 2 may be correspondingly applied to the apparatus according to Embodiment 3. Details will not be described herein again.

A person of ordinary skill in the art can understand that all or some steps in the method in the foregoing embodiments may be performed by relevant hardware that is controlled by a program. The program may be stored in a computer readable storage medium, where the storage medium may be a ROM/RAM, a magnetic disk, an optical disc, or the like.

The foregoing describes the preferred embodiments of the present invention with reference to accompanying drawings, which therefore does not limit rights scope of the present invention. Without departing from the scope and essence of the present invention, the person of ordinary skill in the art may implement the present invention by using multiple variant solutions, for example, a characteristic of an embodiment may be used in another embodiment to obtain still another embodiment. All modifications, equivalent replacement, and improvement that are performed based on the technical concept of this invention fall within the rights scope of this invention.

INDUSTRIAL APPLICABILITY

By means of a proximity detection method and apparatus that are based on HotKnot, and a touch screen terminal that are provided in the present invention, on the basis of a basic threshold, multiple levels of signal strength thresholds are used, and a quantity of sequence frequencies that require to be identified is dynamically adjusted by using the multiple threshold levels according to HotKnot signal strength, thereby improving performance of approach detection in a case in which interference occurs at some frequencies, and increasing reliability and sensitivity of the proximity detection.

In addition, in the present invention, statistics on a history identification situation are further collected, to find some frequencies that often cannot be identified, and shield these frequencies as frequencies at which interference occurs, so that the frequencies at which interference occurs are dynamically shielded according to a detection result, to reduce the interference to the minimum, which can further increase approach detection reliability and communication quality in a case in which a signal is relatively weak.

What is claimed is:

1. A proximity detection method, comprising:
   sending a proximity detection sequence to a touch screen terminal, wherein the proximity detection sequence comprises at least three symbols modulated at different frequencies;
   receiving a proximity response sequence fed back by the touch screen terminal, wherein symbols in the proximity response sequence are the same as those in the proximity detection sequence; and
   determining whether the proximity response sequence is valid according to signal strength of frequencies in the proximity response sequence and at least two preset signal strength thresholds, to determine whether the touch screen terminal approaches, wherein the at least two preset signal strength thresholds comprises a first preset signal strength threshold and a second preset signal strength threshold, the second preset signal strength threshold is greater than the first preset signal strength threshold, the at least two preset signal strength thresholds defines at least three signal strength threshold ranges;
   wherein determining whether the proximity response sequence is valid according to signal strength of frequencies in the proximity response sequence and at least two preset signal strength thresholds to determine whether the touch screen terminal approaches further comprises:
   recording a signal strength of the symbol modulated at each frequency in the proximity response sequence,
   comparing the recorded signal strength of the symbol modulated at each frequency with the at least two preset signal strength thresholds to determine into which signal strength threshold range of the at least three signal strength threshold ranges that the recorded signal strength of the symbol modulated at each frequency falls; and
   when at least three of the recorded signal strength falls into a signal strength threshold range between the first and the second preset signal strength thresholds or falls into a signal strength threshold range greater than the second preset signal strength threshold, determining that the proximity response sequence is valid, and then determining that the touch screen terminal approaches.

2. The proximity detection method according to claim 1, wherein the proximity detection sequence comprises [F1, F2, F3, F4, F5, F6], wherein the F1, F2, F3, F4, F5, and F6 are symbols respectively modulated by using different frequencies, respectively indicate symbols modulated by using 450 KHz, 400 KHz, 350 KHz, 300 KHz, 250 KHz, and 200 KHz, or respectively indicate any six frequencies in a frequency set of {525 KHz, 487.5 KHz, 412.5 KHz, 375 KHz, 337.5 KHz, 262.5 KHz, 225 KHz, 187.5 KHz}.

3. The proximity detection method according to claim 1, wherein the step of determining that the proximity response sequence is valid and determining that the touch screen terminal approaches further comprises:
   when there are two preset signal strength thresholds and the proximity response sequence comprises six symbols modulated at different frequencies, determining that the touch screen terminal approaches in the following cases:
   wherein all of the recorded signal strength falls into a signal strength threshold range greater than the first preset signal strength threshold; or,
   wherein five of the recorded signal strength falls into a signal strength threshold range greater than a first signal strength threshold, and four of the recorded signal strength falls into a signal strength threshold range greater than a second signal strength threshold; or,
   wherein four of the recorded signal strength falls into a signal strength threshold range greater than a first signal strength threshold, and four of the recorded signal strength falls into a signal strength threshold range greater than a second signal strength threshold.

4. The proximity detection method according to claim 1, wherein the step of determining that the proximity response sequence is valid and determining that the touch screen terminal approaches further comprises:
   when there are three preset signal strength thresholds and the proximity response sequence comprises six symbols modulated at different frequencies, determining that the touch screen terminal approaches in the following cases:
   wherein all of the recorded signal strength falls into a signal strength threshold range greater than the first preset signal strength threshold; or,
   wherein five of the recorded signal strength falls into a signal strength threshold range greater than the first preset signal strength threshold, and three of the recorded signal strength falls into a signal strength threshold range greater than the second preset signal strength threshold, and one of the recorded signal strength falls into a signal strength threshold range greater than a third preset signal strength threshold; or, wherein four of the recorded signal strength falls into a signal strength threshold range greater than the first preset signal strength threshold, and three of the recorded signal strength falls into a signal strength threshold range greater than a third preset signal strength threshold;

wherein the third preset signal strength threshold is greater than the second preset signal strength threshold.

5. The proximity detection method according to claim 1, wherein the method further comprises:

sending a proximity detection sequence to the touch screen terminal repeatedly for multiple times, and receiving a corresponding proximity response sequence fed back by the touch screen terminal; and determining that the touch screen terminal approaches if a quantity of times for determining that the proximity response sequence is valid is greater than a preset quantity of times within a preset time period.

6. The proximity detection method according to claim 5, wherein the method further comprises:

counting, within the preset time period, a proportion by which signal strength at each frequency in all approach response sequences is less than a minimum signal strength threshold; and shielding the frequency to ignore data obtained at the frequency when the proportion for a frequency exceeds a preset proportion threshold.

7. A proximity detection apparatus, comprising:

a transmission module configured to send a proximity detection sequence to a touch screen terminal, wherein the proximity detection sequence comprises at least three symbols modulated at different frequencies;

a receiving module configured to receive a proximity response sequence fed back by the touch screen terminal, wherein symbols in the proximity response sequence are the same as those in the proximity detection sequence; and a frequency scan module configured to determine whether the proximity response sequence is valid according to signal strength of frequencies in the proximity response sequence and at least two preset signal strength thresholds, to determine whether the touch screen terminal approaches, wherein the at least two preset signal strength thresholds comprises a first preset signal strength threshold and a second preset signal strength threshold, the second preset signal strength threshold is greater than the first preset signal strength threshold, the at least two preset signal strength thresholds defines at least three signal strength threshold ranges;

wherein the frequency scan module further comprises:

an acquiring unit configured to record a signal strength of the symbol modulated at each frequency in the proximity response sequence, comparing the recorded signal strength of the symbol modulated at each frequency with the at least two preset signal strength thresholds to determine into which signal strength threshold range of the at least three signal strength threshold ranges that the recorded signal strength of the symbol modulated at each frequency falls; and a determining unit, wherein when at least three of the recorded signal strength falls into a signal strength threshold range between the first and the second preset signal strength thresholds or falls into a signal strength threshold range greater than the second preset signal strength thresholds, the determining unit is configured to:

determine that the proximity response sequence is valid, and determine that the touch screen terminal approaches.

8. The proximity detection apparatus according to claim 7, wherein there are two preset signal strength thresholds and the proximity response sequence comprises six symbols modulated at different frequencies, the determining unit is configured to determine that the touch screen terminal approaches in the following cases:

wherein all of the recorded signal strength falls into a signal strength threshold range greater than the first preset signal strength threshold; or, wherein five of the recorded signal strength falls into a signal strength threshold range greater than the first preset signal strength threshold, and four of the recorded signal strength falls into a signal strength threshold range greater than the second preset signal strength threshold; or, wherein four of the recorded signal strength falls into a signal strength threshold range greater than the first preset signal strength threshold, and four of the recorded signal strength falls into a signal strength threshold range greater than the second preset signal strength threshold.

9. The proximity detection apparatus according to claim 7, wherein there are three preset signal strength thresholds and the proximity response sequence comprises six symbols modulated by using different frequencies, the determining unit is configured to determine that the touch screen terminal approaches in the following cases:

wherein all of the recorded signal strength falls into a signal strength threshold range greater than the first preset signal strength threshold; or, wherein five of the recorded signal strength falls into a signal strength threshold range greater than the first preset signal strength threshold, and three of the recorded signal strength falls into a signal strength threshold range greater than the second preset signal strength threshold, and one of the recorded signal strength falls into a signal strength threshold range greater than a third preset signal strength threshold; or, wherein four of the recorded signal strength falls into a signal strength threshold range greater than the first preset signal strength threshold, and three of the recorded signal strength falls into a signal strength threshold range greater than the third preset signal strength threshold;

wherein the third preset signal strength threshold is greater than the second preset signal strength threshold.

10. The proximity detection apparatus according to claim 7, wherein the transmission module is configured to send a proximity detection sequence to the touch screen terminal repeatedly for multiple times;

wherein the receiving module is configured to receive a corresponding proximity response sequence fed back by the touch screen terminal; and wherein the frequency scan module is configured to determine that the touch screen terminal approaches if a quantity of times for determining that the proximity response sequence is valid is greater than a preset quantity of times within a preset time period.

11. The proximity detection apparatus according to claim 10, wherein the apparatus further comprises an interference shielding module, the interference shielding module is configured to:
  count, within the preset time period, a proportion by which signal strength at each frequency in all approach response sequences is less than a minimum signal strength threshold; and
  shield the frequency to ignore data obtained at the frequency, when the proportion for a frequency exceeds a preset proportion threshold.

12. A touch screen terminal, wherein the touch screen terminal comprises a proximity detection apparatus connected to the touch screen, wherein the proximity detection apparatus comprises:
  a transmission module configured to send a proximity detection sequence to an objective device, wherein the proximity detection sequence comprises at least three symbols modulated at different frequencies;
  a receiving module configured to receive a proximity response sequence fed back by the objective device, wherein symbols in the proximity response sequence are the same as those in the proximity detection sequence; and
  a frequency scan module configured to determine whether the proximity response sequence is valid according to signal strength of frequencies in the proximity response sequence and at least two preset signal strength thresholds, to determine whether the objective device approaches, wherein the at least two preset signal strength thresholds comprises a first preset signal strength threshold and a second preset signal strength threshold, the second preset signal strength threshold is greater than the first preset signal strength threshold, the at least two preset signal strength thresholds defines at least three signal strength threshold ranges;
wherein the frequency scan module further comprises:
  an acquiring unit configured to record a signal strength of the symbol modulated at each frequency in the proximity response sequence, comparing the recorded signal strength of the symbol modulated at each frequency with the at least two preset signal strength thresholds to determine into which signal strength threshold range of the at least three signal strength threshold ranges that the recorded signal strength of the symbol modulated at each frequency falls; and
  a determining unit, wherein when at least three of the recorded signal strength falls into a signal strength threshold range between the first and the second preset signal strength thresholds or falls into a signal strength threshold range greater than the second preset signal strength threshold, the determining unit is configured to:
  determine that the proximity response sequence is valid, and determine that the touch screen terminal approaches.

* * * * *